US012626984B2

(12) United States Patent
Lee et al.

(10) Patent No.: US 12,626,984 B2
(45) Date of Patent: May 12, 2026

(54) BATTERY PACK FOR VEHICLE

(71) Applicants:Hyundai Motor Company, Seoul
(KR); Kia Corporation, Seoul (KR)

(72) Inventors: Kang Won Lee, Seongnam-si (KR);
Jeong Hun Seo, Suwon-si (KR); **In
Gook Son**, Incheon (KR)

(73) Assignees: Hyundai Motor Company, Seoul
(KR); Kia Corporation, Seoul (KR)

( * ) Notice: Subject to any disclaimer, the term of this
patent is extended or adjusted under 35
U.S.C. 154(b) by 866 days.

(21) Appl. No.: 17/872,141

(22) Filed: Jul. 25, 2022

(65) Prior Publication Data

US 2023/0115666 A1 Apr. 13, 2023

(30) Foreign Application Priority Data

Oct. 8, 2021 (KR) ........................ 10-2021-0133559

(51) Int. Cl.
H01M 50/209 (2021.01)
H01M 50/103 (2021.01)
H01M 50/298 (2021.01)

(52) U.S. Cl.
CPC ....... H01M 50/209 (2021.01); H01M 50/103
(2021.01); H01M 50/298 (2021.01)

(58) Field of Classification Search
CPC ............. H01M 50/209; H01M 50/103; H01M
50/298; H01M 2200/103; H01M 10/425;
H01M 50/244; H01M 50/249; H01M
50/262; H01M 50/271; H01M 50/296;
H01M 50/50; H01M 50/583; H01M
50/204; H01M 2220/20; Y02E 60/10
See application file for complete search history.

(56) References Cited

U.S. PATENT DOCUMENTS

| | | | |
|---|---|---|---|
| 9,919,591 | B2 | 3/2018 | Mizoguchi et al. |
| 10,232,697 | B2 | 3/2019 | Hara et al. |
| 12,322,826 | B2 | 6/2025 | Chi et al. |
| 2022/0352591 | A1 * | 11/2022 | Chi ..................... H01M 50/264 |

FOREIGN PATENT DOCUMENTS

| | | | | |
|---|---|---|---|---|
| JP | H05208617 | A | 8/1993 | |
| JP | 2000185607 | A | 7/2000 | |
| JP | 2017197047 | A | 11/2017 | |
| KR | 20160127561 | A | 11/2016 | |
| KR | 20180033868 | A | 4/2018 | |
| KR | 20210041950 | A | 4/2021 | |
| WO | 2021025469 | A1 | 2/2021 | |
| WO | 2021075780 | A1 | 4/2021 | |
| WO | WO-2021071071 | A1 * | 4/2021 | .......... H01M 50/507 |

* cited by examiner

*Primary Examiner* — Daniel S Gatewood
(74) *Attorney, Agent, or Firm* — Slater Matsil, LLP

(57) ABSTRACT

An embodiment battery pack for a vehicle includes a plurality of battery modules disposed in a casing, a casing member provided in the casing to secure rigidity of the casing, and a wiring assembly disposed in the casing member. Another embodiment battery pack for a vehicle includes a plurality of battery modules arranged flatly, a casing surrounding a bottom and lateral sides of the battery modules, a casing member provided lengthwise in the casing along an arranged direction of the battery modules, and a wiring assembly provided in a space defined by a recessed portion recessed inward in a cross-sectional view of the casing member.

14 Claims, 9 Drawing Sheets

BATTERY PACK FOR VEHICLE

CROSS-REFERENCE TO RELATED APPLICATIONS

This application claims the benefit of Korean Patent Application No. 10-2021-0133559, filed on Oct. 8, 2021, which application is hereby incorporated herein by reference.

TECHNICAL FIELD

The disclosure relates to a battery pack for a vehicle.

BACKGROUND

An electric vehicle or a hybrid vehicle is provided with a high-voltage battery to supply the power needed for the vehicle.

The high-voltage battery is mounted to the vehicle in various forms, and mounted to a lower side of the vehicle in the form of a battery pack.

The battery pack includes a plurality of battery modules, and each battery module includes a plurality of battery cells.

The battery pack includes a bus bar for electrically connecting the battery modules. Sensing wirings for sensing the voltage, current, temperature, etc. of the battery module are installed.

Hereinafter, a conductor, an electric wire, or a combination thereof for forming the electrical connection in the battery pack like the bus bar, the sensing wiring, etc. will be collectively called a 'wiring assembly.'

Matters described as the related art are provided merely for promoting understanding for the background of the disclosure, and should not be taken as the prior art already known to a person having ordinary knowledge in the art.

SUMMARY

The disclosure relates to a battery pack for a vehicle. Particular embodiments relate to a wiring technology for a battery pack mounted to a vehicle.

Therefore, embodiments of the disclosure have been made in view of problems in the art, and an embodiment of the disclosure provides a battery pack for a vehicle, in which a wiring assembly for forming electrical connection inside the battery pack to be mounted to the vehicle is arranged with higher spatial efficiency and thus does not wastefully occupy an inner space of the battery pack, so that the number of battery modules to be loaded can be increased or the volume of the battery pack can be reduced, thereby achieving a more compact battery pack.

According to one embodiment of the disclosure, a battery pack for a vehicle includes a casing accommodating a plurality of battery modules, a casing member provided in the casing to secure rigidity of the casing, and a wiring assembly placed inside the casing member.

The battery modules in the casing may be arranged flatly to form a single layer, and the casing member may be rectilinearly disposed in a direction parallel to a plane formed by the battery modules, and includes a space to place the wiring assembly therein.

The casing member may be disposed to cross an inside of the casing longitudinally, and the wiring assembly placed inside the casing member may be connected to a front connector, which is connected to outside, through a first end connector, which is connected to outside, through a first end of the casing member and is connected to a power-relay assembly through a second end of the casing member.

The wiring assembly placed inside the casing member may be connected to a fuse mounted to a front of the casing through the first end of the casing member.

The casing member may be configured in a structure of a cross-section where lateral sides are parallel to the battery modules and a bottom side is opened, and the wiring assembly may be inserted in the opened cross-section.

The wiring assembly may be inserted in a space formed by the bottom-opened cross-section of the casing member and a mid-plate supporting the bottom of the battery module.

The casing member may be formed with lateral grooves at lateral sides thereof facing toward the battery modules, and the wiring assembly may be inserted in the lateral groove of the casing member.

The wiring assembly may be inserted in a space formed by the lateral groove of the casing member and the battery module.

Further, according to another embodiment of the disclosure, a battery pack for a vehicle includes a plurality of battery modules arranged flatly, a casing surrounding a bottom and lateral sides of the battery module, a casing member provided lengthwise in the casing along an arranged direction of the battery modules, and a wiring assembly inserted in a space formed by a recessed portion recessed inward in a cross-section of the casing member.

The recessed portion of the casing member may be opened toward the bottom of the casing, and the wiring assembly may be disposed to be constrained in a space formed by a bottom-recessed portion of the casing member and a mid-plate of the casing.

The recessed portion of the casing member may be opened in lateral directions of the casing, and the wiring assembly may be disposed to be constrained in a space formed by the lateral recessed portion of the casing member and the battery module.

The casing member may be disposed lengthwise in the casing in a longitudinal direction, and the wiring assembly may be connected to a front connector, which is connected to outside, through a first end of the casing member and is connected to a power relay assembly through a second end of the casing member.

The wiring assembly placed in the recessed portion of the casing member may be connected to a fuse, which is mounted to a front of the casing, through the first end of the casing member.

DETAILED DESCRIPTION OF ILLUSTRATIVE EMBODIMENTS

Figure 1:
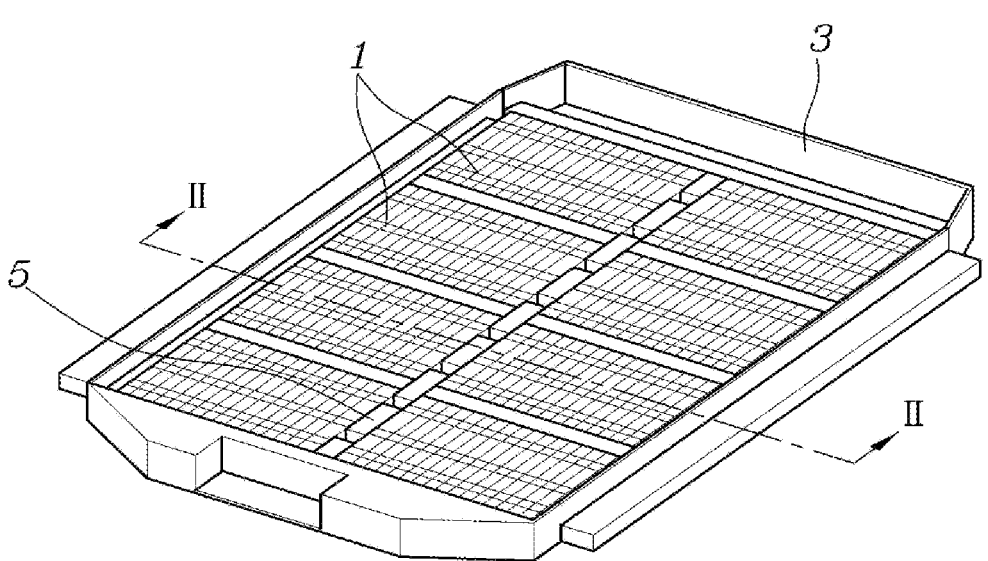
FIG. 1 is a view showing a first embodiment of a battery pack for a vehicle according to the disclosure.

Regarding embodiments of the disclosure disclosed in this specification or application, the specific structural or functional description is merely illustrative for the purpose of describing the embodiments of the disclosure, and embodiments of the disclosure may be implemented in various forms but should not be construed as being limited to the embodiments set forth in this specification or application.

Because the embodiments of the disclosure may be variously modified and have various forms, specific exemplary embodiments will be illustrated in the drawings and described in detail in this specification or application. However, it should be understood that embodiments of the disclosure are intended not to be limited to the specific embodiments but to cover all modifications, equivalents or alternatives without departing from the spirit and technical scope of the disclosure.

Terms such as "first" and/or "second" are used herein merely to describe a variety of elements, but the elements are not limited by these terms. Such terms are used only for the purpose of distinguishing one element from another element. For example, without departing from the conceptual scope of the disclosure, a first element may be referred to as a second element, and vice versa.

When a certain element is referred to as being "connected to" or "coupled to" another element, it will be understood that they may be directly connected to or coupled to each other or intervening elements may be present therebetween. On the other hand, when a certain element is referred to as being "directly connected to" or "directly coupled to" another element, it will be understood that no intervening elements are present therebetween. Other expressions describing relationships between elements, such as "between," "immediately between," "adjacent to," "directly adjacent to," etc., may also be construed in the same manner.

Terms used in this specification are merely used for explaining specific embodiments, but are not intended to limit the disclosure. Unless the context clearly dictates otherwise, singular forms include plural forms as well. It is to be understood that terms such as "include," "have," etc. as used herein specify the presence of stated features, integers, steps, operations, elements, components, or combinations thereof, but do not preclude the presence or addition of one or more other features, integers, steps, operations, elements, components or combinations thereof.

Unless defined otherwise, all terms used herein including technical or scientific terms have the same meanings as those generally understood by a person having ordinary knowledge in the art to which the disclosure pertains. The terms such as those defined in generally used dictionaries are construed to have meanings matching that in the context of related technology and, unless clearly defined otherwise, are not construed to be ideally or excessively formal.

Below, the disclosure will be described in detail by describing exemplary embodiments with reference to the accompanying drawings. Like reference numerals in the drawings refer to like numerals.

The embodiments of the disclosure, which are shown in FIGS. 1 to 9 commonly have a casing 3 for accommodating a plurality of battery modules 1, a casing member 5 provided in the casing 3 to secure the rigidity of the casing 3, and a wiring assembly 7 placed inside the casing member 5.

The battery modules 1 in the casing 3 form a single layer and are flatly disposed, and the casing member 5 is rectilinearly disposed in a direction parallel to a plane formed by the battery modules 1, and provided with a space in which the wiring assembly 7 is disposed.

In other words, according to embodiments of the disclosure, the wiring assembly 7 does not wastefully occupy an inner space of the battery pack because the plurality of battery modules 1 is placed inside the casing 3 reinforced by the casing member 5 and the wiring assembly 7 is placed inside the casing member 5, so that the number of battery modules 1 to be loaded can be increased or the volume of the battery pack can be reduced, thereby achieving a more compact battery pack.

Figure 5:
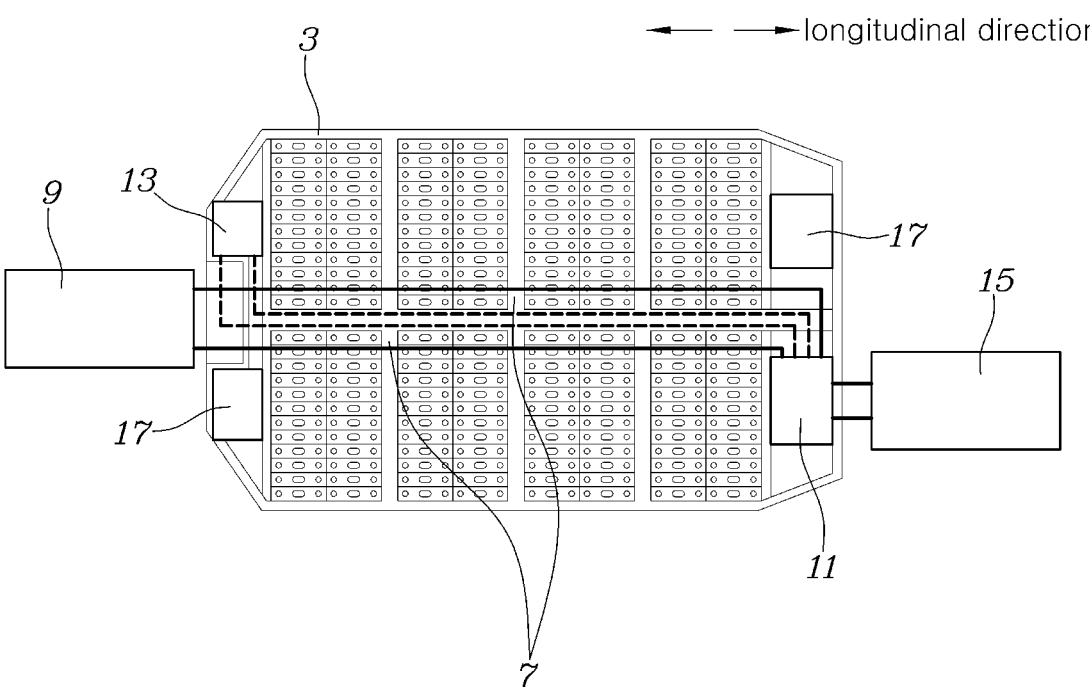
FIG. 5 is a view illustrating electrical connection based on the wiring assembly according to embodiments of the disclosure.
Figure 6:
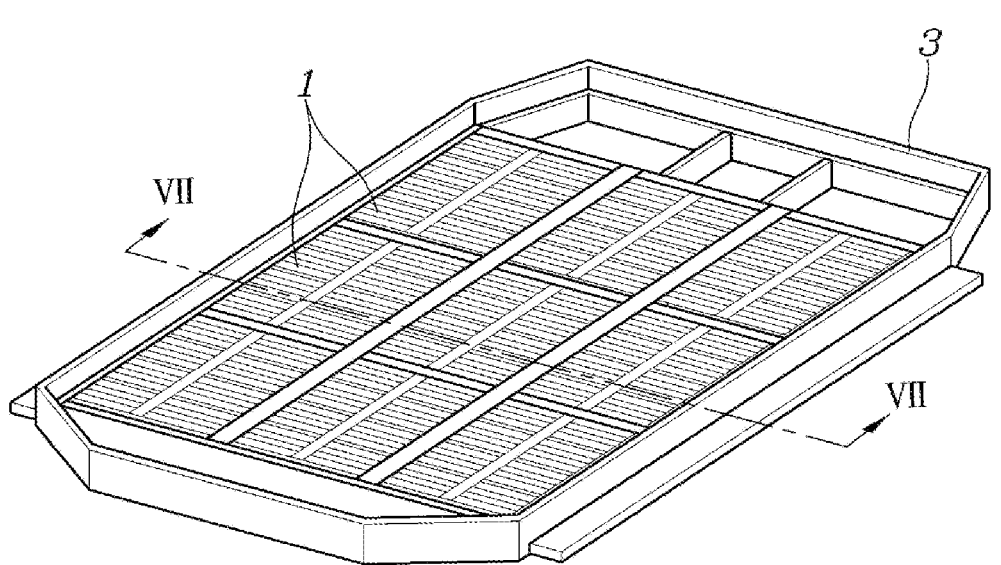
FIG. 6 is a view showing a battery pack for a vehicle according to a second embodiment of the disclosure.

Referring to FIG. 5, the casing member 5 is disposed to longitudinally cross the inside of the casing 3, and the wiring assembly 7 placed inside the casing member 5 is connected to a front connector 9, which will be connected to the outside, through a front end of the casing member 5 and is connected to a power-relay assembly 11 through a rear end of the casing member 5.

Further, the wiring assembly 7 placed inside the casing member 5 is connected to a fuse 13, which is mounted to the front of the casing 3 through the front end of the casing member 5.

In terms of electrical connections, the power-relay assembly 11 is connected to the fuse 13 and the front connector 9 through the wiring assembly 7, and a rear connector 15 is separately connected to the power-relay assembly 11 so that power can be output to the outside of the battery pack.

For reference, a battery management unit (BMU) 17 may be mounted next to the fuse 13 or the power-relay assembly 11, and electric wires and the like connected to the BMU 17, etc. are also included in the wiring assembly 7. However, for convenience, only electric wires used in connection with the power-relay assembly 11, the fuse 13, and the front connector 9 are referred to as the wiring assembly 7.

Further, the casing member 5 is not limited to those disposed in the longitudinal direction of the casing 3 according to the embodiments, but may be disposed in a transverse direction according to the arranged states of the battery modules 1 and other devices.

In the first embodiment shown in FIGS. 1 to 4, the casing member 5 is structured to have a cross-section of which lateral sides are parallel to the battery module 1 and a bottom side is opened, and the wiring assembly 7 is inserted in the opened cross-section.

Figure 2:
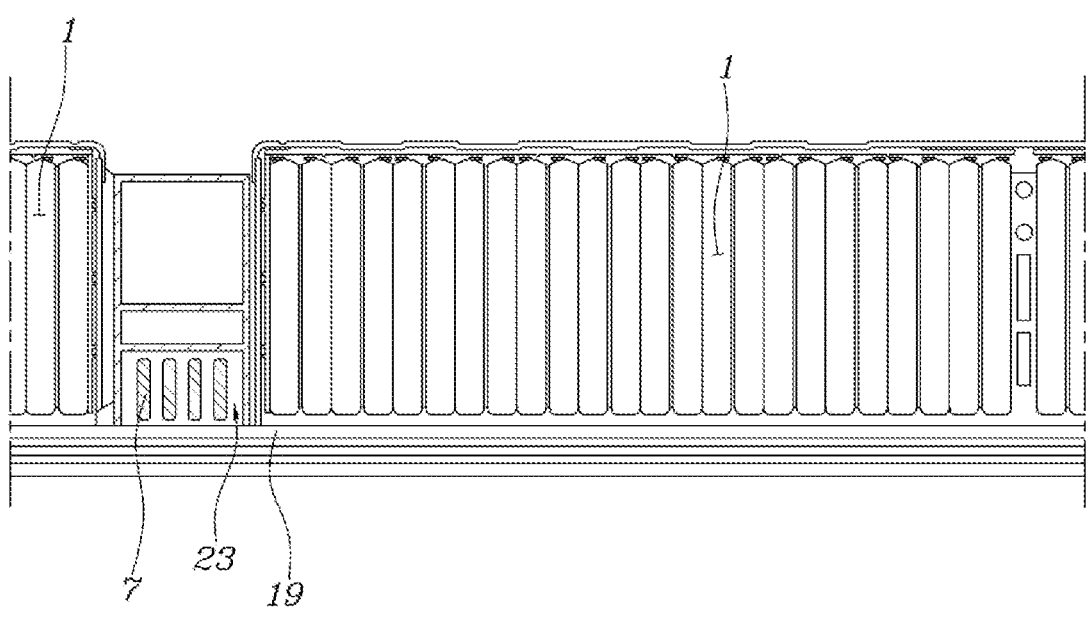
FIG. 2 is a cross-sectional view taken along line II-II of FIG. 1.
Figure 3:
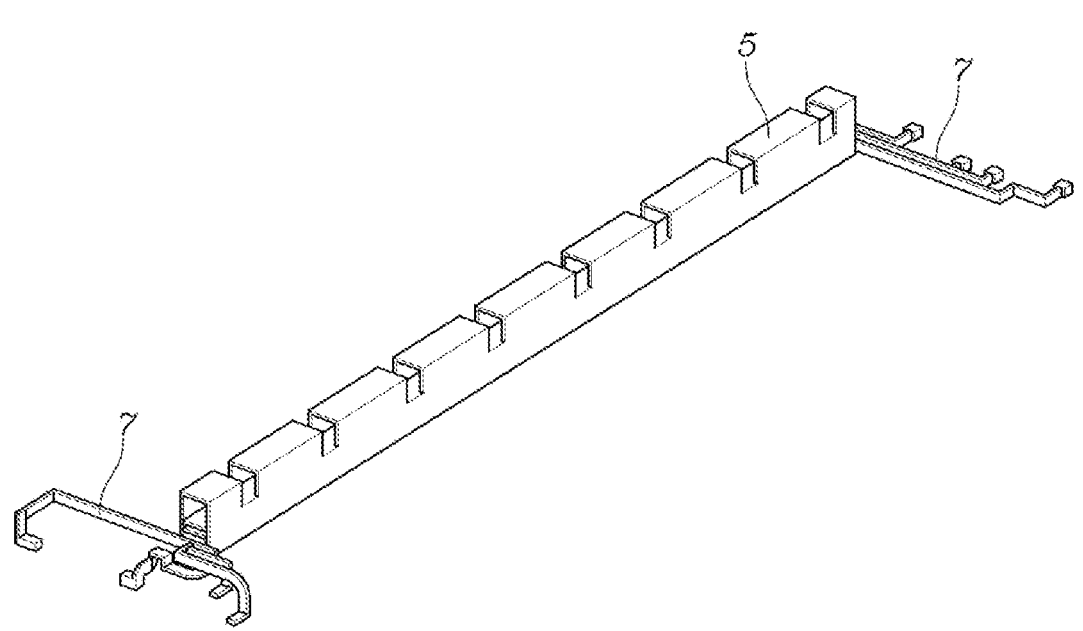
FIG. 3 is a view showing a state that a wiring assembly is inserted in a casing member of FIG. 1.

In other words, as shown in the cross-section of FIG. 2, the wiring assembly 7 is inserted in a space formed between the bottom-opened cross-section of the casing member 5 and a mid-plate 19 supporting the bottom of the battery module 1.

Thus, the casing member 5 not only serves to secure the rigidity of the casing 3, but also serves as a passage for the wiring assembly 7. Therefore, additional space for placing the wiring assembly 7 therein is not required, and the wiring assembly 7 is protected in a stable state.

Figure 4:
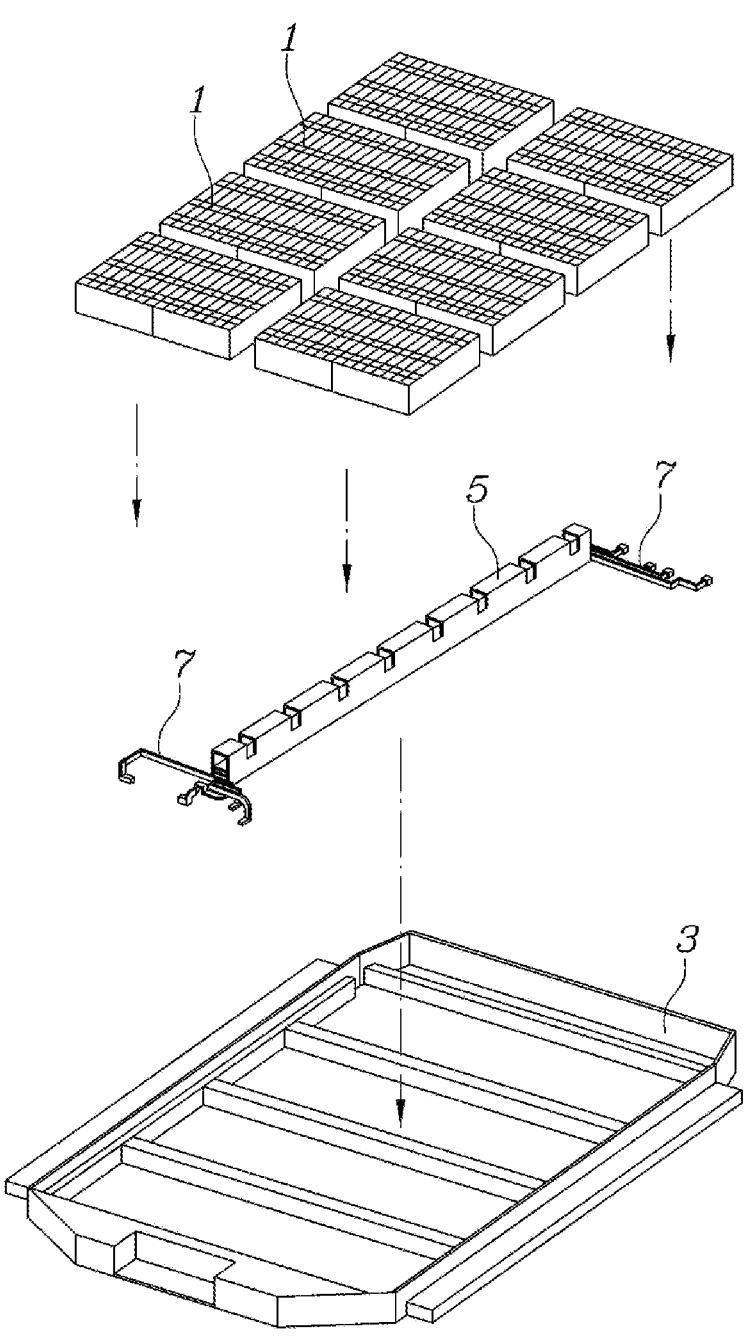
FIG. 4 is a view for explaining that the battery pack of FIG. 1 is formed according to a first embodiment.

In this embodiment, as shown in FIG. 4, the battery pack is assembled in such a manner that the casing member 5, in which the wiring assembly 7 is inserted, is coupled to the casing 3, and then the battery modules 1 are arranged.

Meanwhile, the main reason why the wiring assembly 7 is inserted in the bottom-opened cross-section of the casing member 5 is that there is a structural limitation on mounting the battery module 1 to the casing member. Therefore, if the structure of mounting the battery module 1 to the casing member 5 is changeable, the wiring assembly 7 may be placed in any portion of the casing member 5 other than the bottom side.

In a second embodiment illustrated in FIGS. 6 to 9, the casing member 5 is formed with lateral grooves 21 at lateral sides thereof facing toward the battery modules 1, and the wiring assembly 7 is inserted in the lateral grooves 21 of the casing member 5.

Figure 7:
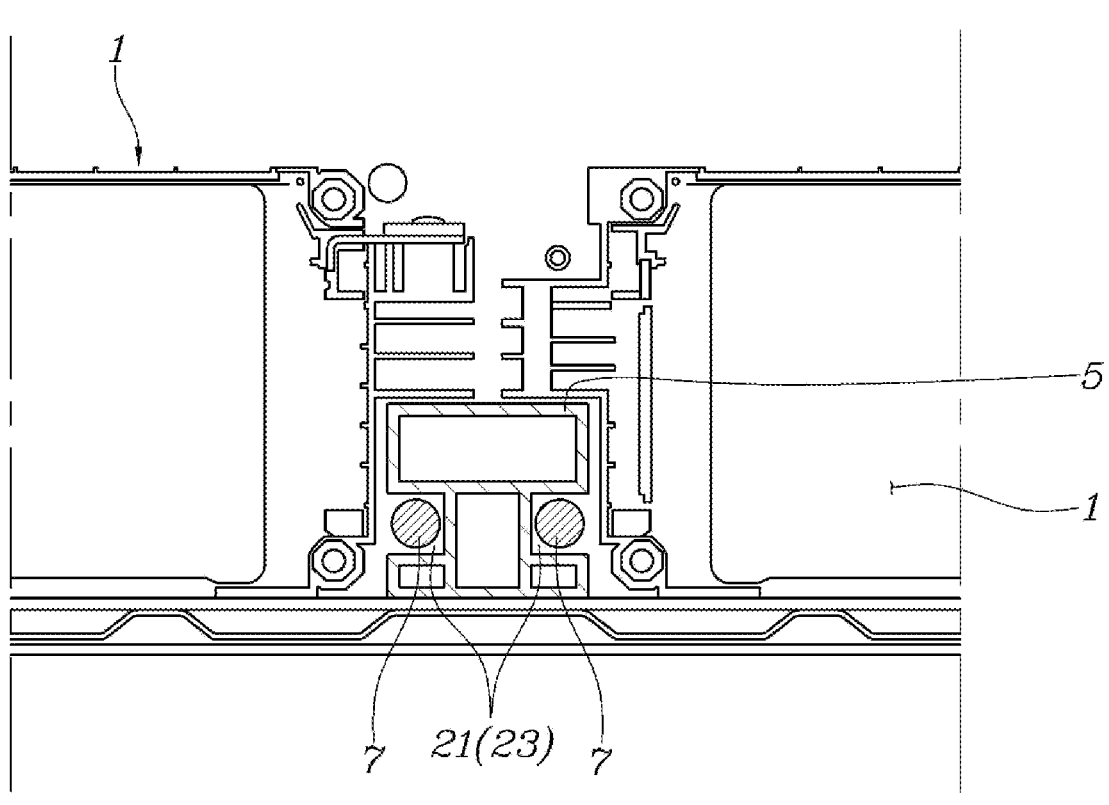
FIG. 7 is a cross-sectional view taken along line VII-VII of FIG. 6.
Figure 8:
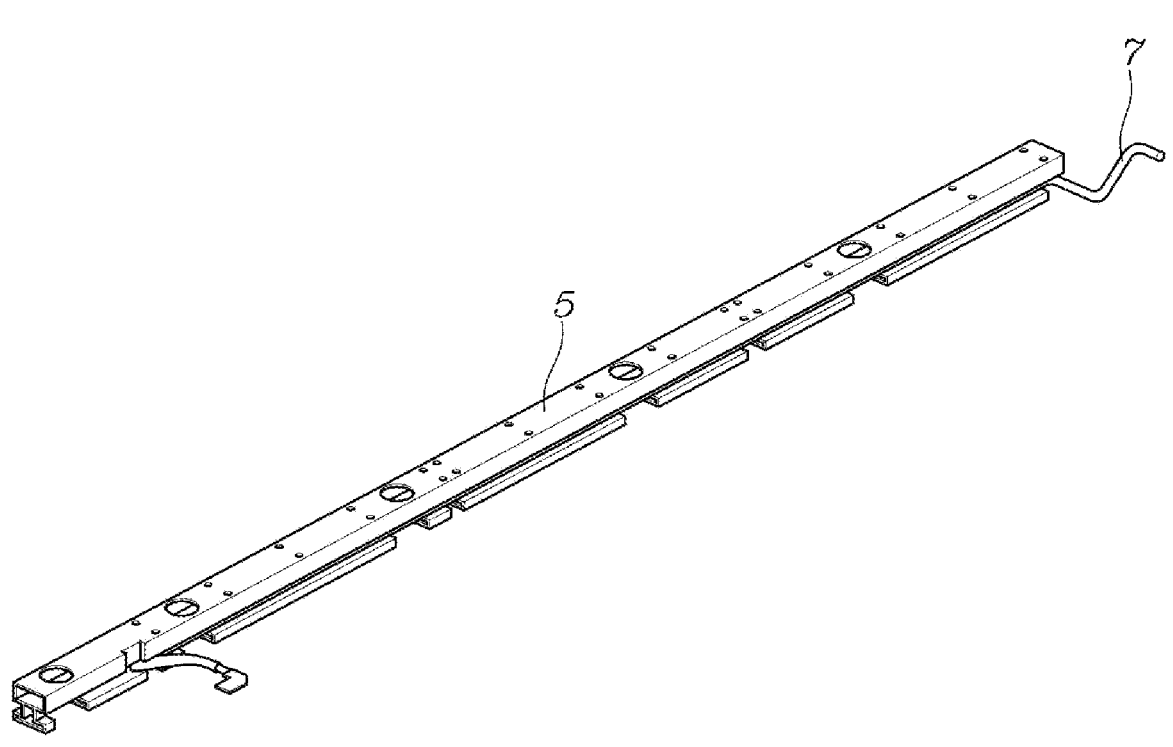
FIG. 8 is a view showing a state that a wiring assembly is inserted in a casing member of FIG. 6.

In other words, as shown in the cross-section of FIG. 7, the wiring assembly 7 in this embodiment is inserted in a space formed between the lateral grooves 21 of the casing member 5 and the battery module 1.

Even in this embodiment, like the first embodiment, the casing member 5 basically serves to secure the rigidity of the casing 3, but also provides a space in which the wiring assembly 7 will be placed, so that another space for placing the wiring assembly 7 therein is not additionally required, and functions to protect the wiring assembly 7 in a stable state.

Therefore, the battery pack can be configured compact in size.

Figure 9:
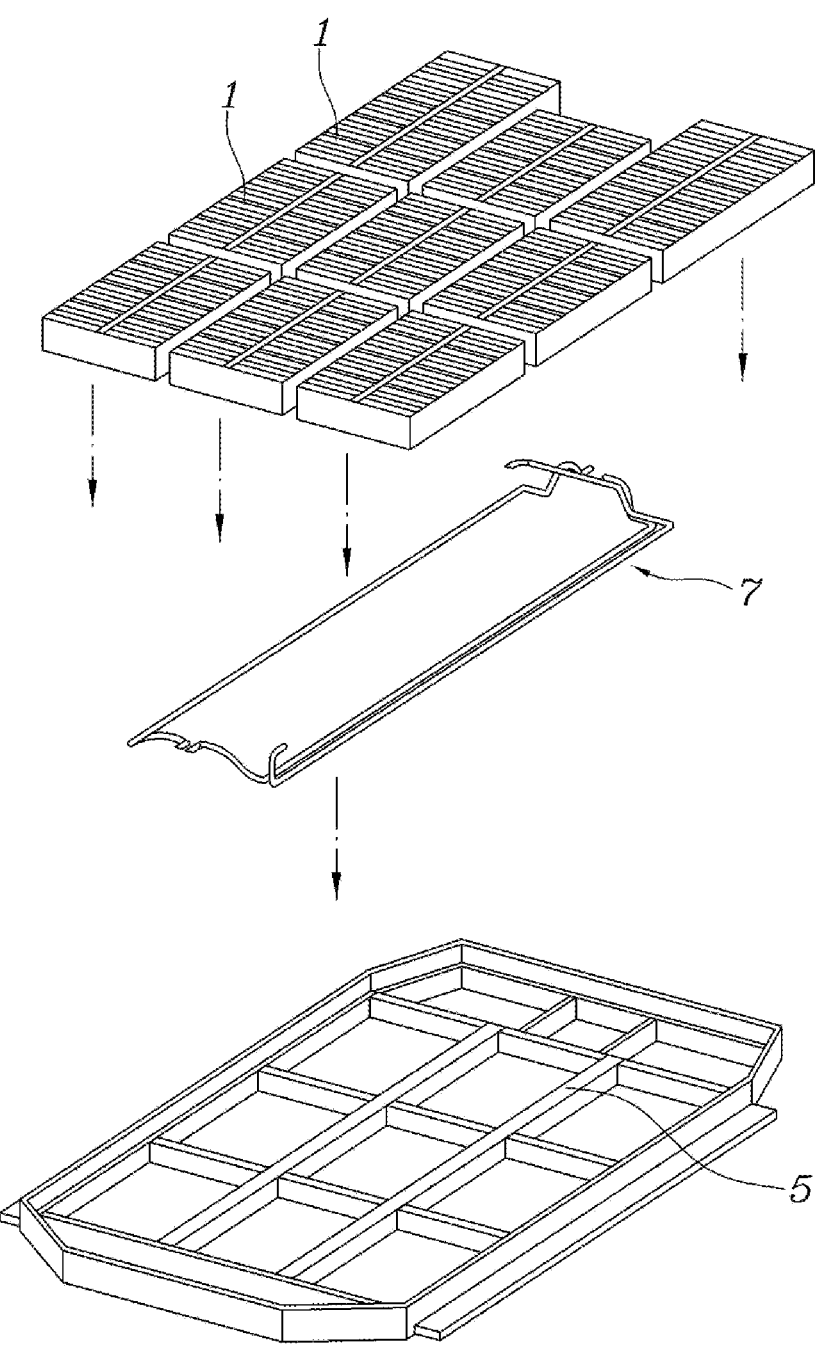
FIG. 9 is a view for illustrating that the battery pack of FIG. 6 is formed according to an embodiment.

For reference, in this embodiment as shown in FIG. 9, the battery pack is assembled in such a manner that the wiring assembly 7 is coupled to the casing 3 to which the casing member 5 has already been coupled, and then the battery modules 1 are arranged.

The foregoing embodiments of the disclosure may also be expressed as follows.

The battery pack for the vehicle according to the disclosure includes the plurality of battery modules 1 arranged flatly, the casing 3 surrounding the bottom and the lateral sides of the battery module 1, the casing member 5 provided lengthwise in the casing 3 along the arranged direction of the battery modules 1, and the wiring assembly 7 inserted in the space formed by a recessed portion 23 recessed inward in the cross-section of the casing member 5.

In other words, in the first embodiment, the recessed portion 23 of the casing member 5 is opened toward the bottom side of the casing 3, and the wiring assembly 7 is disposed to be constrained in the space formed between a bottom-recessed portion 23 of the casing member 5 and the mid-plate 19 of the casing 3.

Further, in the second embodiment, the recessed portion 23 of the casing member 5 refers to a shape opened in lateral directions of the casing 3 and corresponds to the lateral grooves 21, and the wiring assembly 7 is disposed to be constrained in the space formed between the lateral recessed portion 23 of the casing member 5 and the battery module 1.

Here, the casing member 5 is disposed lengthwise in the casing 3 in the longitudinal direction, and the wiring assembly 7 may be connected to the front connector 9, which is connected to the outside, through the front end of the casing member 5 and may be connected to the power-relay assembly 11 through the rear end of the casing member 5.

Further, the wiring assembly 7 placed in the recessed portion 23 of the casing member 5 may be connected to the fuse 13 which is mounted to the front of the casing 3 through the front end of the casing member 5.

For reference, a plurality of casing members 5 are disposed in the longitudinal direction and the transverse direction of the casing 3. According to embodiments of the disclosure, it is illustrated that the wiring assembly 7 is accommodated in the casing member 5 disposed in the longitudinal direction. Of course, the wiring assembly 7 may alternatively be accommodated in the casing member 5 disposed in the transverse direction.

Further, the casing member 5 in the longitudinal direction and the casing member in the transverse direction may be coupled as a single body by welding or applying adhesive at an intersecting portion thereof.

According to embodiments of the disclosure, a wiring assembly for forming an electrical connection inside the battery pack to be mounted to the vehicle is disposed with higher spatial efficiency and thus does not wastefully occupy an inner space of the battery pack, so that the number of battery modules to be loaded can be increased or the volume of the battery pack can be reduced, thereby achieving a more compact battery pack.

Although specific embodiments of the disclosure are illustrated and described, it will be obvious to a person having ordinary knowledge in the art that a variety of improvements and changes can be made in the disclosure without departing from the technical idea of the disclosure defined in the appended claims.

What is claimed is:

1. A battery pack for a vehicle, the battery pack comprising:
   a casing;
   a plurality of battery modules disposed in the casing;
   a casing member provided in the casing to secure rigidity of the casing; and
   a wiring assembly disposed in the casing member,
   wherein the casing member is disposed to longitudinally cross an inside of the casing, and
   wherein the wiring assembly is connected to a front connector, which is connected to an outside, through a first end of the casing member, and is connected to a power relay assembly through a second end of the casing member.

2. The battery pack of claim 1, wherein:
   the battery modules are arranged flatly in a single layer; and
   the casing member is rectilinearly disposed in a direction parallel to a plane formed by the battery modules and provided with a space to receive the wiring assembly.

3. The battery pack of claim 1, wherein the wiring assembly disposed in the casing member is connected to a fuse mounted to a front of the casing through the first end of the casing member.

4. The battery pack of claim 2, wherein:
   the casing member has a structure in which lateral sides are parallel to the battery modules and a bottom side is open to define an open region in a cross-sectional view; and
   the wiring assembly is provided in the open region.

5. The battery pack of claim 4, wherein the wiring assembly is provided in the space defined by the open region of the casing member and a mid-plate supporting a bottom of the battery modules.

6. The battery pack of claim 2, wherein:
   the casing member comprises lateral grooves at lateral sides thereof facing toward the battery modules; and
   the wiring assembly is provided in the lateral grooves of the casing member.

7. The battery pack of claim 6, wherein the wiring assembly is provided in the space defined by the lateral grooves of the casing member and the battery modules.

8. A method of forming a battery pack for a vehicle, the method comprising:
   disposing a plurality of battery modules in a casing;

disposing a casing member in the casing to secure rigidity of the casing; and disposing a wiring assembly in the casing member wherein the casing member is disposed to longitudinally cross an inside of the casing, and wherein the wiring assembly is connected to a front connector, which is connected to an outside, through a first end of the casing member, and is connected to a power relay assembly through a second end of the casing member.

9. The method of claim 8, wherein:

the battery modules are arranged flatly in a single layer; and the casing member is rectilinearly disposed in a direction parallel to a plane formed by the battery modules and provided with a space to receive the wiring assembly.

10. The method of claim 9, wherein the wiring assembly is connected to a fuse mounted to a front of the casing through the first end of the casing member.

11. The method of claim 9, wherein:

the casing member has a structure in which lateral sides are parallel to the battery modules and a bottom side is open to define an open region in a cross-sectional view; and the wiring assembly is provided in the open region.

12. The method of claim 11, wherein the wiring assembly is provided in the space defined by the open region of the casing member and a mid-plate supporting a bottom of the battery modules.

13. The method of claim 9, wherein:

the casing member comprises lateral grooves at lateral sides thereof facing toward the battery modules; and the wiring assembly is provided in the lateral grooves of the casing member.

14. The method of claim 13, wherein the wiring assembly is provided in the space defined by the lateral grooves of the casing member and the battery modules.

* * * * *